United States Patent
Liu

(10) Patent No.: US 9,367,104 B2
(45) Date of Patent: Jun. 14, 2016

(54) ELECTRONIC DEVICE AND HEAT DISSIPATION METHOD

(71) Applicant: Acer Incorporated, New Taipei (TW)

(72) Inventor: Che-Jung Liu, New Taipei (TW)

(73) Assignee: Acer Incorporated, New Taipei (TW)

(*) Notice: Subject to any disclaimer, the term of this patent is extended or adjusted under 35 U.S.C. 154(b) by 130 days.

(21) Appl. No.: 14/231,735

(22) Filed: Mar. 31, 2014

(65) Prior Publication Data
US 2015/0237764 A1    Aug. 20, 2015

(30) Foreign Application Priority Data
Feb. 19, 2014    (TW) .................................. 103105527

(51) Int. Cl.
| | |
|---|---|
| *H05K 7/20* | (2006.01) |
| *G06F 1/20* | (2006.01) |
| *G06F 1/16* | (2006.01) |
| *H01H 9/52* | (2006.01) |
| *H01H 13/82* | (2006.01) |

(52) U.S. Cl.
CPC .............. *G06F 1/203* (2013.01); *G06F 1/1662* (2013.01); *H01H 9/52* (2013.01); *H01H 13/82* (2013.01); *H01H 2213/002* (2013.01); *H01H 2213/008* (2013.01); *H01H 2227/02* (2013.01); *H01H 2231/042* (2013.01)

(58) Field of Classification Search
CPC .............................. G06F 3/0202; H01H 13/82
USPC .................................................... 361/679.46
See application file for complete search history.

(56) References Cited

U.S. PATENT DOCUMENTS

| | | | | |
|---|---|---|---|---|
| 6,596,953 | B2* | 7/2003 | Chu ....................... | H01H 13/70 200/341 |
| 6,664,901 | B1* | 12/2003 | Yamada ............... | H01H 13/702 200/302.1 |

FOREIGN PATENT DOCUMENTS

| | | | | |
|---|---|---|---|---|
| JP | 2012073734 A | * | 9/2010 | ................ G06F 3/02 |
| TW | M388085 | | 9/2010 | |
| TW | 201129306 | | 8/2011 | |
| TW | 201227780 | | 7/2012 | |

OTHER PUBLICATIONS

Machine translation of JP2012-073734.*

* cited by examiner

*Primary Examiner* — Tuan T Dinh
*Assistant Examiner* — Mukund G Patel
(74) *Attorney, Agent, or Firm* — Jianq Chyun IP Office

(57) ABSTRACT

An electronic device including a main body, a supporting layer and at least one press element is provided. The main body has an inner space. The supporting layer is disposed on the main body and covers the inner space, wherein the supporting layer has at least one first opening. The press element is disposed on the supporting layer and has a chamber and at least one second opening, wherein the first opening and the second opening are connected to the chamber. When the press element is pressed and elastically deformed, air inside the chamber flows to the inner space through the first opening. When the press element is stopped being pressed and restored, air outside the chamber flows to inside the chamber through the second opening. In addition, a heat dissipation method adapted to the electronic device is also provided.

8 Claims, 3 Drawing Sheets

ELECTRONIC DEVICE AND HEAT DISSIPATION METHOD

CROSS-REFERENCE TO RELATED APPLICATION

This application claims the priority benefit of Taiwan application serial no. 103105527, filed on Feb. 19, 2014. The entirety of the above-mentioned patent application is hereby incorporated by reference herein and made a part of this specification.

BACKGROUND OF THE INVENTION

1. Field of the Invention

The invention relates to an electronic device and a heat dissipation method, and more particularly, to an electronic device having a press element and a heat dissipation method thereof.

2. Description of Related Art

Notebook computer generally include functions similar to that of desktop computer and designs in reducing volume and weight so that a user may carry it around with ease, which makes the notebook computer a portable tool indispensable for specific users. With continuous price drop of notebook computer, the specific users even directly use the notebook computer as a replacement of the desktop computer.

Heat is generated during operations of a central processing unit (CPU) or other heat generation elements inside the notebook computer, thus many notebook computers are disposed with a heat dissipation fan for heat dissipation. However, with current trend in compact design for portable electronic devices, some notebook computers are designed to perform heat dissipation merely by using heat dissipation elements such as heat pipes without including the heat dissipation fan, but a heat dissipation efficiency thereof is often insufficient and prone to system overheat.

SUMMARY OF THE INVENTION

The invention is directed to an electronic device having favorable heat dissipation efficiency.

An electronic device of the invention includes a main body, a supporting layer and at least one press element. The main body has an inner space. The supporting layer is disposed on the main body and covers the inner space, wherein the supporting layer has at least one first opening. The press element is disposed on the supporting layer and has a chamber and at least one second opening, wherein the first opening and the second opening are connected to the chamber. When the press element is pressed and elastically deformed, air inside the chamber flows to the inner space through the first opening. When the press element is stopped being pressed and restored, air outside the chamber flows to inside the chamber through the second opening.

In an embodiment of the invention, when the press element is pressed and elastically deformed, a volume of the chamber is decreased, and when the press element is stopped being pressed and restored, volume of the chamber is increased.

In an embodiment of the invention, the press element includes an elastic portion and a press portion. The elastic portion is disposed on the supporting layer, wherein the chamber and the second opening are formed on the elastic portion. The press portion is connected to the elastic portion, and adapted to be pressed so that the elastic portion is elastically deformed.

In an embodiment of the invention, when the press portion is pressed so that the elastic portion is elastically deformed, the press portion covers the second opening.

In an embodiment of the invention, the supporting layer has a first cover portion, and the first cover portion connects to a part of an inner margin of the first opening and covers the first opening. When the press element is pressed and elastically deformed, air inside the chamber drives the first cover portion to expand to outside the chamber from the first opening. When the press element is stopped being pressed and restored, the inner margin of the first opening prevents the first cover portion from expanding to inside the chamber from the first opening.

In an embodiment of the invention, an inner diameter of the first opening gradually increases along a direction away from the chamber to form a first block incline on the inner margin of the first opening, and the first block incline prevents the first cover portion from expanding to inside the chamber from the first opening.

In an embodiment of the invention, the press element has a second cover portion, and the second cover portion connects to a part of an inner margin of the second opening and covers the second opening. When the press element is pressed and elastically deformed, the inner margin of the second opening prevents the second cover portion from expanding to outside the chamber from the second opening. When the press element is stopped being pressed and restored, air outside the chamber drives the second cover portion to expand to inside the chamber from the second opening.

In an embodiment of the invention, an inner diameter of the second opening gradually decreases along a direction away from the chamber to form a second block incline on the inner margin of the second opening, and the second block incline prevents the second cover portion from expanding to outside the chamber from the second opening.

In an embodiment of the invention, the electronic device includes an input module, wherein the press element is a key of the input module, and the supporting layer is a key membrane of the input module.

A heat dissipation method of the invention is adapted to an electronic device. The electronic device includes a main body and a press element, and the heat dissipation method includes: pressing the press element so that the press element is elastically deformed to drive air inside the press element to flow to inside the main body; and stopping pressing the press element so that the press element is restored to drive air outside the press element to flow to inside the press element.

Based on above, in the electronic device of the invention, the first opening of the supporting layer and the second opening of the press element are both connected to the chamber of the press element. Accordingly, when the press element is pressed by the user so that the volume of the chamber is decreased, pressure inside the chamber is increased so that air inside the chamber flows to inside the main body of the electronic device through the first opening to form the heat dissipation airflow. In addition, when the press element is released by the user so that the volume of the chamber is increased back to its original volume, pressure inside the chamber is decreased so that the low-temperature air from the outside flows to inside the chamber through the second opening, such that the press element is capable of constantly providing the heat dissipation airflow with low-temperature to inside the main body of the electronic device while being pressed by the user, thereby improving the heat dissipation efficiency of the electronic device.

To make the above features and advantages of the disclosure more comprehensible, several embodiments accompanied with drawings are described in detail as follows.

DESCRIPTION OF THE EMBODIMENTS

Figure 1:
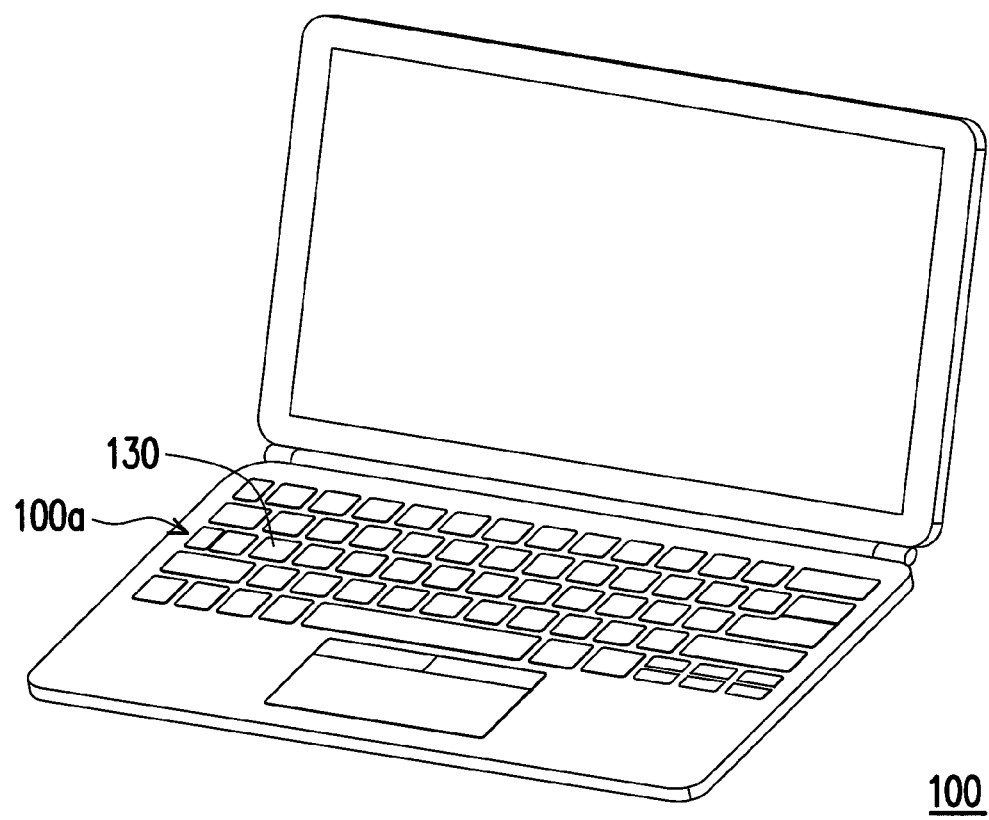
FIG. 1 is a 3D diagram of an electronic device according to an embodiment of the invention.
Figure 2:
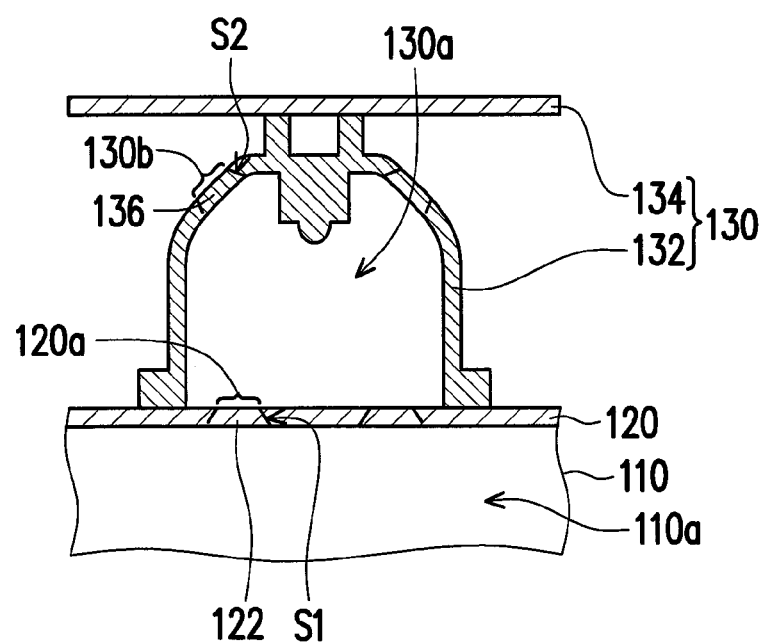
FIG. 2 is a local cross-sectional diagram of the electronic device of FIG. 1.

FIG. 1 is a 3D diagram of an electronic device according to an embodiment of the invention. FIG. 2 is a local cross-sectional diagram of the electronic device of FIG. 1. Referring to FIG. 1 and FIG. 2, an electronic device 100 includes a main body 110, a supporting layer 120 and at least one press element 130 (illustrated in plural in FIG. 1). The main body 110 has an inner space 110a. The supporting layer 120 is disposed on the main body 110 and covers the inner space 110a of the main body 110, wherein the supporting layer 120 has at least one first opening 120a (two of which are illustrated in FIG. 2). The press element 130 is disposed on the supporting layer 120 and has a chamber 130a and at least one second opening 130b (two of which are illustrated in FIG. 2), wherein each first opening 120a and each second opening 130b are connected to the chamber 130a.

Figure 3A:
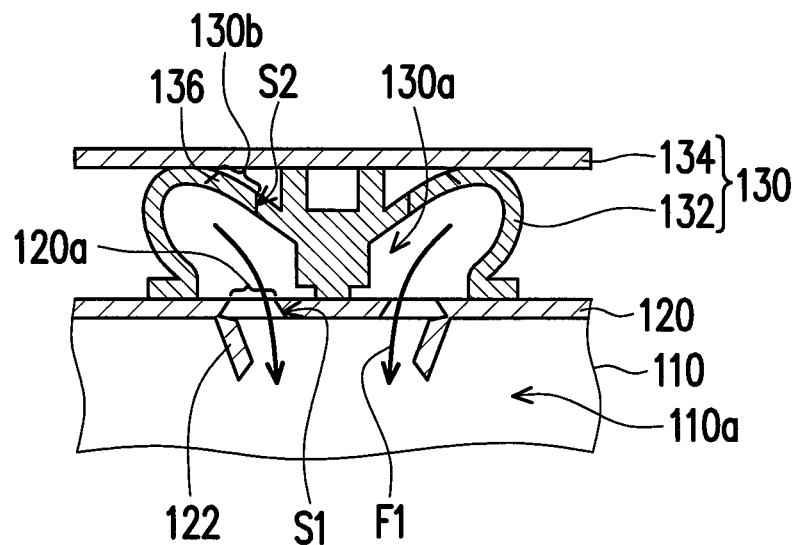
FIG. 3A is a schematic diagram of the press element of FIG. 1 being pressed.
Figure 3B:
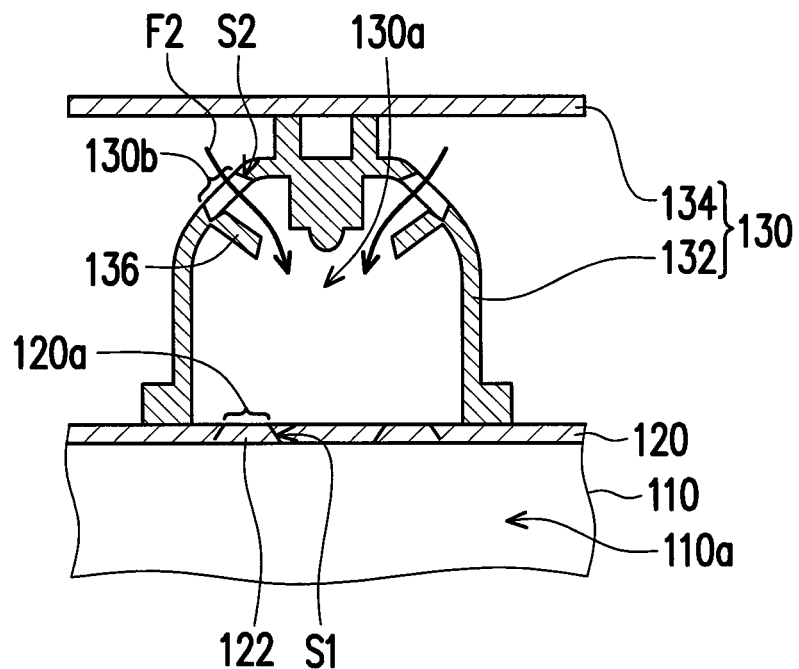
FIG. 3B is a schematic diagram of the press element of FIG. 3A being released.

FIG. 3A is a schematic diagram of the press element of FIG. 1 being pressed. FIG. 3B is a schematic diagram of the press element of FIG. 3A being released. When the press element 130 is pressed by a user and elastically deformed so that a volume of the chamber 130a is decreased as shown in FIG. 3A, pressure inside the chamber 130a is increased so that air inside the chamber 130a (marked as an airflow F1 in FIG. 3A) flows to the inner space 110a of the main body 110 through each first opening 120a to form a heat dissipation airflow. When the press element 130 is stopped being pressed and restored so that the volume of the chamber 130a is increased back to its original volume, pressure inside the chamber 130a is decreased so that a low-temperature air outside the chamber 130a (marked as an airflow F2 in FIG. 3B) flows to inside the chamber 130a through each second opening 130, so that the press element 130 is capable of constantly providing the heat dissipation airflow with low-temperature to the inner space 110a of the main body 110 of the electronic device 100 while being pressed by the user, thereby improving a heat dissipation efficiency of the electronic device 100.

According to the present embodiment, the electronic device 100 is, for example, a notebook computer which includes an input module 100a (illustrated as a keyboard module in FIG. 1). The press element 130 is, for example, a key of the input module 100a, and the supporting layer 120 is, for example, a key membrane of the input module 100a. In other embodiments, the electronic device 100 may be a device in other types while the press element may be elements of input module in other types, and the invention is not limited thereto. For instance, the press element may be a key of a touch pad of the notebook computer.

Referring to FIG. 2, the press element 130 of the present embodiment includes an elastic portion 132 and a press portion 134. A material of the elastic portion 132 is, for example, a rubber or other elastic materials. The elastic portion 132 is disposed on the supporting layer 120, and the chamber 130a and the second opening 130b are formed on the elastic portion 132. The press portion 134 is connected to the elastic portion 132, and adapted to be pressed so that the elastic portion 132 is elastically deformed as shown in FIG. 3A.

More specifically, a material of the supporting layer 120 of the present embodiment is, for example, an elastic material, and the supporting layer 120 includes at least one first cover portion 122 (two of which are illustrated in FIG. 2). The first cover portion 122 is integrally formed to connect to a part of an inner margin of the first opening 120a and covers the first opening 120a. When the press element 130 is pressed and elastically deformed as shown in FIG. 3A, air inside the chamber 130a drives the first cover portion 122 to expand to outside the chamber 130a from the first opening 120a as shown in FIG. 3A, so that said air may be smoothly flowed to the inner space 110a of the main body 110 through the first opening 120a. When the press element 130 is stopped being pressed and restored as shown in FIG. 3B, the first cover portion 122 may be restored back to its original position through an elastic restoring force of the supporting layer 120, and the inner margin of the first opening 120a may prevent the first cover portion 122 from expanding to inside the chamber 130a from the first opening 120a, so as to prevent air inside the inner space 110a from flowing back to the chamber 130a through the first opening 120a, thereby ensuring that a sufficient amount of the low-temperature air may enter the chamber 130a through the second opening 130b at the time. More specifically, an inner diameter of the first opening 120a gradually increases along a direction away from the chamber 130a to form a first block incline S1 on the inner margin of the first opening 120a, and the first block incline S1 is used to prevent the first cover portion 122 from expanding to inside the chamber 130a from the first opening 120a. In other embodiments, other appropriate structures may also be used to prevent the first cover portion from expanding to inside the chamber from the first opening. In addition, it is also possible that the first cover portion is not disposed, and the invention is not limited thereto.

Similarly, the elastic portion 132 of the press element 130 of the present embodiment includes at least one second cover portion 136 (two of which are illustrated in FIG. 2), and the second cover portion 136 is integrally formed to connect to a part of an inner margin of the second opening 130b and covers the second opening 130a. When the press element 130 is pressed and elastically deformed as shown in FIG. 3A, the inner margin of the second opening 130b prevents the second cover portion from expanding to outside the chamber 130a from the second opening 130b, so as to prevent air inside the chamber 130a from flowing back to the outside through the second opening 130b, thereby ensuring that the sufficient amount of the low-temperature air may enter the inner space 110a of the main body 110 through the first opening 120a at the time. When the press element 130 is stopped being pressed and restored as shown in FIG. 3B, the low-temperature air outside the chamber 130a drives the second cover portion 136 to expand to inside the chamber 130a from the second opening 130b, so that said low-temperature air may be smoothly flowed to inside the chamber 130a through the second opening 130b, and then the second cover portion 136 may be restored back to its original position as shown in FIG.

2 through an elastic restoring force of the elastic portion 132. More specifically, an inner diameter of the second opening 130b gradually decreases along a direction away from the chamber 130a to form a second block incline S2 on the inner margin of the second opening 130b, and the second block incline S2 is used to prevent the second cover portion 136 from expanding to outside the chamber 130a from the second opening 130b. In other embodiments, other appropriate structures may also be used to prevent the second cover portion from expanding to outside the chamber from the second opening. In addition, it is also possible that the second cover portion is not disposed, and the invention is not limited thereto.

Figure 4:
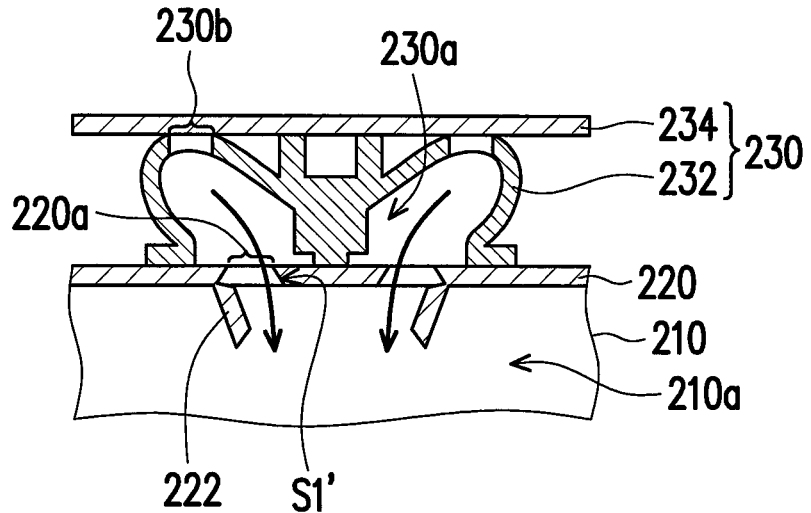
FIG. 4 is a local cross-sectional view illustrating an electronic device according to another embodiment of the invention.

FIG. 4 is a local cross-sectional view illustrating an electronic device according to another embodiment of the invention. In the embodiment shown in FIG. 4, dispositions and actions regarding a main body 210, an inner space 210a, a supporting layer 220, a first opening 220a, a first cover portion 222, a first block incline S1', a press element 230, a chamber 230a, a second opening 230b, an elastic portion 232 and a press portion 234 are similar to dispositions and actions regarding the main body 110, the inner space 110a, the supporting layer 120, the first opening 120a, the first cover portion 122, the first block incline S1, the press element 130, the chamber 130a, the second opening 130b, the elastic portion 132 and the press portion 134 as shown in FIG. 3A, thus related description thereof is omitted hereinafter. A difference between the embodiment of FIG. 4 and the embodiment of FIG. 3A is that, the elastic portion 232 of the press element 230 does not include the second cover portion 136 depicted in FIG. 3A, and when the press portion 234 is pressed as shown in FIG. 4 so that the elastic portion 232 is elastically deformed, the press element 230 covers the second opening 230b by using the press portion 234.

Figure 5:
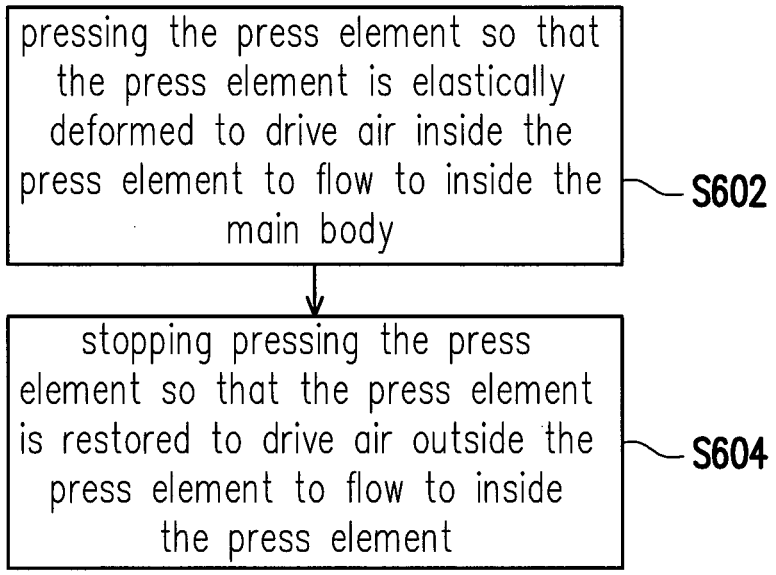
FIG. 5 is a flowchart of a heat dissipation method according to an embodiment of the invention.

A heat dissipation method of the invention is described below by reference with aforesaid electronic device 100. FIG. 5 is a flowchart of a heat dissipation method according to an embodiment of the invention. First, referring to FIG. 3A and FIG. 5, the press element 130 is pressed so that the press element 130 is elastically deformed to drive air inside the press element 130 to flow to inside the main body 110 (step S602). Next, referring to FIG. 3B and FIG. 5, the press element 130 is stopped being pressed so that the press element 130 is restored to drive air outside the press element 130 to flow to inside the press element 130 (step S604).

In summary, in the electronic device of the invention, the first opening of the supporting layer and the second opening of the press element are both connected to the chamber of the press element. Accordingly, when the press element is pressed by the user and elastically deformed so that the volume of the chamber is decreased, pressure inside the chamber is increased so that air inside the chamber flows to the inner space of the main body of the electronic device through the first opening to form the heat dissipation airflow. In addition, when the press element is released by the user and restored so that the volume of the chamber is increased back to its original volume, pressure inside the chamber is decreased so that the low-temperature air from the outside flows to inside the chamber through the second opening, such that the press element is capable of constantly providing the heat dissipation airflow with low-temperature to inside the main body of the electronic device while being pressed by the user, thereby improving the heat dissipation efficiency of the electronic device.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An electronic device, comprising:
   a main body, having an iruler space;
   a supporting layer, disposed on the main body and covering the inner space,
   wherein the supporting layer has at least one first opening; and
      at least one press element, disposed on the supporting layer and having a chamber and at least one second opening, wherein the first opening and the second opening are connected to the chamber, and the second opening is exposed outside the main body,
      in response to the press element being pressed and elastically deformed, air inside the chamber flows to the inner space through the first opening, and in response to the press element being stopped being pressed and restored, air outside the chamber flows to inside the chamber through the second opening,
      wherein the press element comprises an elastic portion and a press portion, the elastic portion is disposed on the supporting layer, the chamber and the second opening are formed on the elastic portion, the press portion is connected to the elastic portion and adapted to be pressed so that the elastic portion is elastically deformed,
      wherein in response to the press portion being pressed so that the elastic portion is elastically deformed, the press portion covers the second opening.

2. The electronic device of claim 1, wherein in response to the press element being pressed and elastically deformed, a volume of the chamber is decreased, and in response to the press element being stopped being pressed and restored, volume of the chamber is increased.

3. The electronic device of claim 1, wherein the supporting layer has a first cover portion, and the first cover portion connects to a part of an inner margin of the first opening and covers the first opening; in response to the press element being pressed and elastically deformed, air inside the chamber drives the first cover portion to expand to outside the chamber from the first opening; and in response to the press element being stopped being pressed and restored, the inner margin of the first opening prevents the first cover portion from expanding to inside the chamber from the first opening.

4. The electronic device of claim 3, wherein an inner diameter of the first opening gradually increases along a direction away from the chamber to form a first block incline on the inner margin of the first opening, and the first block incline prevents the first cover portion from expanding to inside the chamber from the first opening.

5. The electronic device of claim 1, wherein the press element has a second cover portion, and the second cover portion connects to a part of an inner margin of the second opening and covers the second opening; in response to the press element being pressed and elastically deformed, the inner margin of the second opening prevents the second cover portion from expanding to outside the chamber from the second opening; and in response to the press element being stopped being pressed and restored, air outside the chamber drives the second cover portion to expand to inside the chamber from the second opening.

6. The electronic device of claim 5, wherein an inner diameter of the second opening gradually decreases along a direction away from the chamber to form a second block incline on the inner margin of the second opening, and the second block incline prevents the second cover portion from expanding to outside the chamber from the second opening.

7. The electronic device of claim 1, comprising an input module, wherein the press element is a key of the input module, and the supporting layer is a key membrane of the input module.

8. A heat dissipation method, adapted to an electronic device, the heat dissipation method comprising:
providing a main body having an inner space;
providing a supporting layer disposed on the main body and covering the inner space, wherein the supporting layer has at least one first opening;
providing at least one press element disposed on the supporting layer and having a chamber and at least one second opening, wherein the first opening and the second opening are connected to the chamber, the second opening is exposed outside the main body, the press element comprises an elastic portion and a press portion, the elastic portion is disposed on the supporting layer, the chamber and the second opening are formed on the elastic portion, the press portion is connected to the elastic portion and adapted to be pressed so that the elastic portion is elastically deformed;
pressing the press portion so that the elastic portion is elastically deformed to drive air inside the press element to flow to the inner space through the first opening, and the press portion covers the second opening; and
releasing the press element so that the press element is restored to drive air outside the main body to flow inside the chamber through the second opening.

* * * * *